(12) United States Patent
Yatagawa et al.

(10) Patent No.: US 11,605,506 B2
(45) Date of Patent: Mar. 14, 2023

(54) CERAMIC ELECTRONIC DEVICE AND MANUFACTURING METHOD OF THE SAME

(71) Applicant: TAIYO YUDEN CO., LTD., Tokyo (JP)

(72) Inventors: Kiyoshiro Yatagawa, Tokyo (JP); Haruna Ubukata, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 27 days.

(21) Appl. No.: 17/092,036

(22) Filed: Nov. 6, 2020

(65) Prior Publication Data

US 2021/0151256 A1 May 20, 2021

(30) Foreign Application Priority Data

Nov. 19, 2019 (JP) .............................. JP2019-208881

(51) Int. Cl.
| | |
|---|---|
| *H01G 4/30* | (2006.01) |
| *H01G 4/012* | (2006.01) |
| *H01G 2/06* | (2006.01) |
| *H01G 4/008* | (2006.01) |
| *H01G 4/12* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/224; H01G 2/065; H01G 4/008; H01G 4/1218
See application file for complete search history.

(56) References Cited

U.S. PATENT DOCUMENTS

| | | | |
|---|---|---|---|
| 10,366,834 B1* | 7/2019 | Lee ........................ | H01G 4/248 |
| 11,183,332 B2* | 11/2021 | Kim ........................ | H01G 4/224 |
| 2003/0134133 A1 | 7/2003 | Kimura et al. ............... | 428/469 |
| 2011/0273056 A1 | 11/2011 | Mizuno et al. ............... | 310/311 |
| 2011/0287176 A1 | 11/2011 | Saito et al. ................ | 427/126.2 |

(Continued)

FOREIGN PATENT DOCUMENTS

| | | | |
|---|---|---|---|
| JP | 2002-033237 A | | 1/2002 |
| JP | 2012-004544 A | | 1/2012 |

(Continued)

*Primary Examiner* — Michael P McFadden
(74) *Attorney, Agent, or Firm* — Stein IP, LLC

(57) ABSTRACT

A ceramic electronic device includes, a multilayer chip in which each of a plurality of dielectric layers and each of a plurality of internal electrode layers are alternately stacked, external electrodes provided on the first end face and the second end face, and a water repellent agent formed on a surface of the external electrodes. A thickness A (>0) of the water repellent agent on at least one of four faces of the external electrodes that cover an upper face in a stacking direction, a lower face in the stacking direction, and two side faces of the multilayer chip is larger than a thickness B (>0) of the water repellent agent on faces of the external electrodes that cover the first end face and the second end face.

10 Claims, 8 Drawing Sheets

(56) References Cited

U.S. PATENT DOCUMENTS

| | | | | |
|---|---|---|---|---|
| 2016/0095223 A1* | 3/2016 | Yoshida | ............... | H01G 4/12 |
| | | | | 361/301.4 |
| 2017/0256359 A1* | 9/2017 | Masunari | ............... | H01G 4/005 |
| 2018/0082788 A1* | 3/2018 | Asano | ............... | H01G 4/005 |
| 2019/0103224 A1* | 4/2019 | Han | ............... | H01G 4/2325 |
| 2019/0385795 A1* | 12/2019 | Yang | ............... | H01G 4/30 |
| 2021/0082622 A1* | 3/2021 | Kim | ............... | H01G 4/232 |

FOREIGN PATENT DOCUMENTS

| | | |
|---|---|---|
| JP | 5304800 B2 | 10/2013 |
| JP | 2015-115392 A | 6/2015 |

\* cited by examiner

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application Publication No. 2019-208881, filed on Nov. 19, 2019, the entire contents of which are incorporated herein by reference.

FIELD

A certain aspect of the present invention relates to a ceramic electronic device and a manufacturing method of the ceramic electronic device.

BACKGROUND

Since electronic devices are downsized and thicknesses of the electronic devices are reduced, downsizing and thickness reduction of ceramic electronic devices are required. The ceramic electronic devices are used for various electronic devices. Therefore, usage under various conditions of the ceramic electronic devices is required. As an example, the ceramic electronic devices are used under a high temperature and a high humidity. However, when the ceramic electronic devices are used under the high temperature and the high humidity, water adheres to a surface of the ceramic electronic devices because of dew condensation. And, electrical breakdown may occur. And so, there is discloses a technology in which a water repellent agent is provided on the surface of the ceramic electronic devices by surface treatment (for example, see Japanese Patent Application Publication No. 2015-115392).

SUMMARY OF THE INVENTION

However, in the technology, it is necessary to remove the water repellent agent of a surface of external electrodes, before mounting of the ceramic electronic devices, in order to prevent mounting failure.

According to an aspect of the present invention, there is provided a ceramic electronic device including: a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer structure, the first end face facing with the second end face; external electrodes provided on the first end face and the second end face; and a water repellent agent formed on a surface of the external electrodes, wherein a thickness A (>0) of the water repellent agent on at least one of four faces of the external electrodes that cover an upper face in a stacking direction, a lower face in the stacking direction, and two side faces of the multilayer chip is larger than a thickness B (>0) of the water repellent agent on faces of the external electrodes that cover the first end face and the second end face.

According to another aspect of the present invention, there is provided a manufacturing method of a ceramic electronic device including: preparing a ceramic electronic device having a multilayer chip, and external electrodes; and forming an water repellent agent on a surface of the external electrodes; wherein the multilayer chip has a structure in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face facing with the second end face, the external electrodes being provided on the first end face and the second end face, wherein a thickness A (>0) of the water repellent agent on at least one of four faces of the external electrodes that cover an upper face in a stacking direction, a lower face in the stacking direction, and two side faces of the multilayer chip is larger than a thickness B (>0) of the water repellent agent on faces of the external electrodes that cover the first end face and the second end face.

DETAILED DESCRIPTION

A description will be given of an embodiment with reference to the accompanying drawings.

Figure 1:
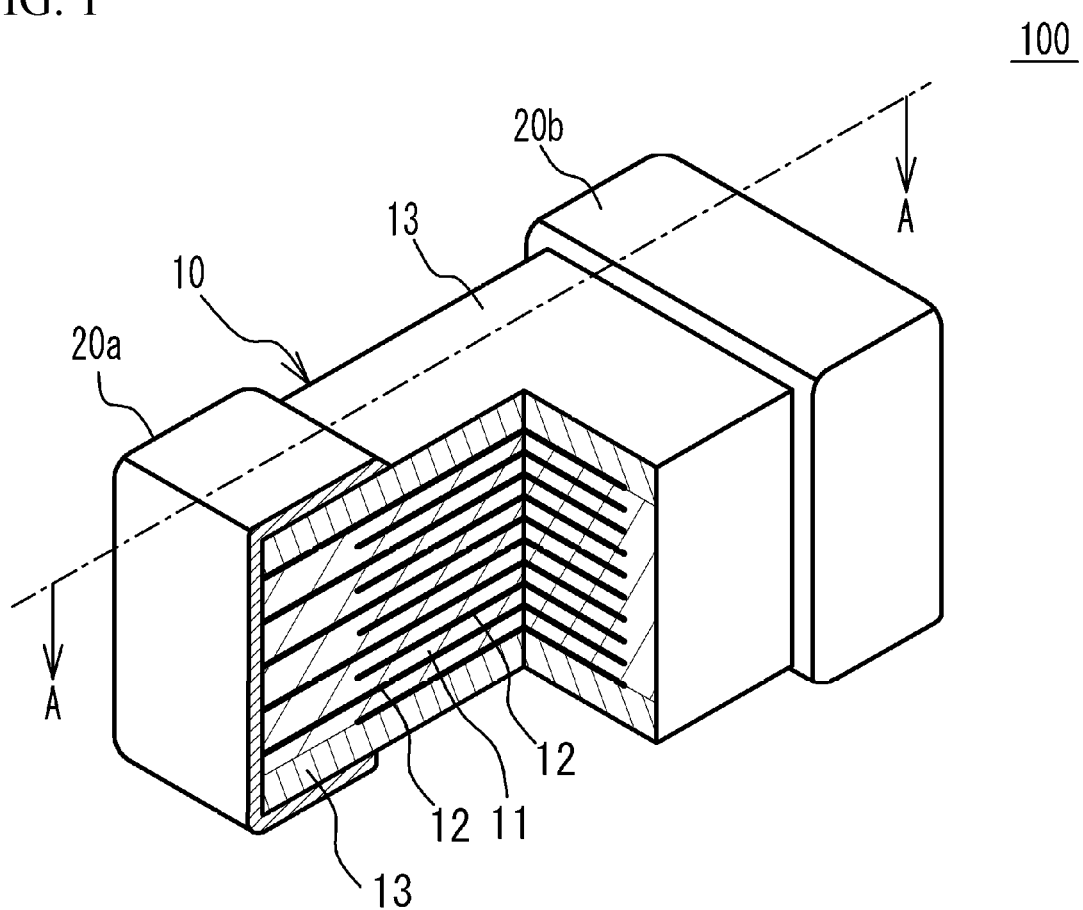
FIG. 1 illustrates a perspective view of a multilayer ceramic capacitor in which a cross section of a part of the multilayer ceramic capacitor is illustrated.

(Embodiment) A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other. Therefore, at least a part of each of the upper face, the lower face and the two side faces of the multilayer chip 10 is not covered by the external electrodes 20a and 20b and is exposed to atmosphere.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
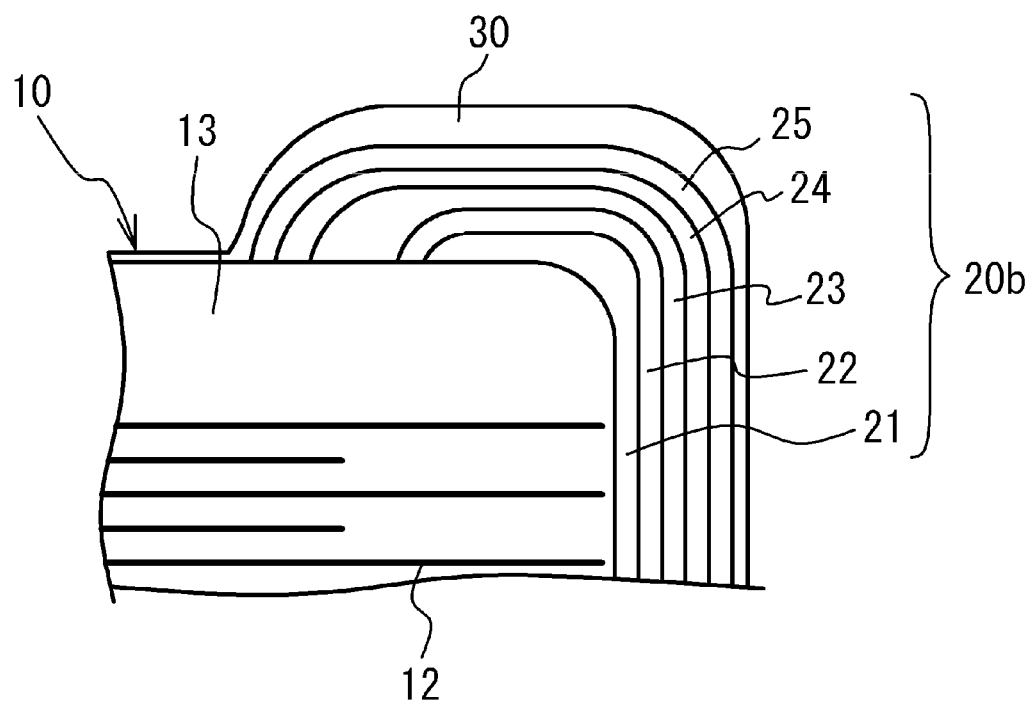
FIG. 2 illustrates a cross sectional view of an external electrode and is a partial cross sectional view taken along a line A-A of FIG. 1.

FIG. 2 illustrates a cross sectional view of the external electrode 20b and is a partial cross sectional view taken along a line A-A of FIG. 1. In FIG. 2, hatching for cross section is omitted. As illustrated in FIG. 2, the external electrode 20b has a structure in which a first plated layer 22 such as Cu, a conductive resin layer 23, a second plated layer 24 such as Ni and a third plated layer 25 such as Sn are formed on a base layer 21 in this order. The base layer 21, the first plated layer 22, the conductive resin layer 23, the second plated layer 24 and the third plated layer 25 extend toward the upper face, the lower face, and the two side faces of the multilayer chip 10 from the both end faces of the multilayer chip 10.

A main component of the base layer 21 is a metal such as Cu, Ni, Al (aluminum) or Zn (zinc). The base layer 21 includes a glass component for densifying the base layer 21 or a co-material for controlling sinterability of the base layer 21. The base layer 21 including these ceramic components has high adhesiveness with the cover layer 13 whose main component is a ceramic material. The conductive resin layer 23 is a resin layer including a metal component such as Ag. The conductive resin layer 23 is flexible. Therefore, the conductive resin layer 23 suppresses stress caused by deflection of a substrate on which the multilayer ceramic capacitor 100 is mounted. The first plated layer 22 is provided in order to increase adhesiveness between the base layer 21 and the conductive resin layer 23. The external electrode 20a has the same structure as the external electrode 20b. The conductive resin layer 23 may not be necessarily provided.

When the external electrodes 20a and 20b have the structure illustrated in FIG. 2 and the multilayer ceramic capacitor 100 is used in high-temperature and high-humidity condition, a metal component of the conductive resin layer 23 may diffuse because of water adhered to the surface of the multilayer ceramic capacitor 100. In this case, reliability of the multilayer ceramic capacitor 100 may be degraded. For example, the metal component of the conductive resin layer 23 may diffuse to the surface of the multilayer chip 10 between the external electrode 20a and the external electrode 20b (migration phenomena). Even if the external electrodes 20a and 20b do not include the conductive resin layer 23, another metal component of the external electrodes 20a and 20b may diffuse.

And so, the multilayer ceramic capacitor 100 of the embodiment has a structure in which a water repellent agent is provided on a surface of the external electrode 20a and 20b.

Figure 3A:
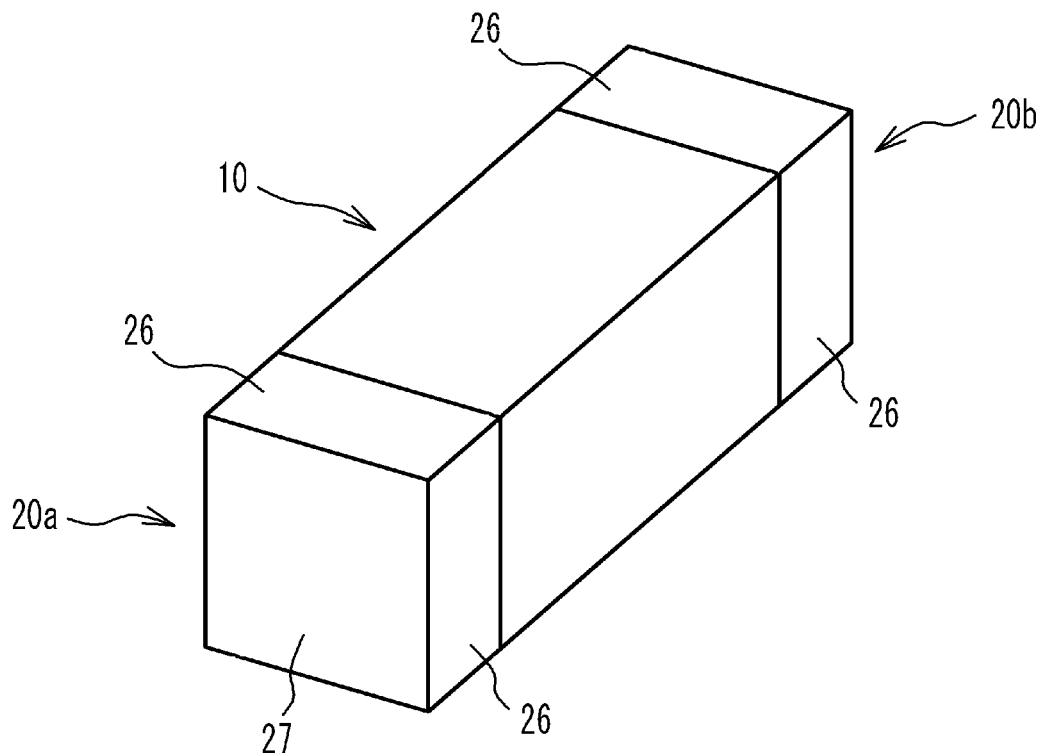
FIG. 3A and FIG. 3B illustrate an outer circumference of external electrodes and edge faces external electrodes.
Figure 3B:
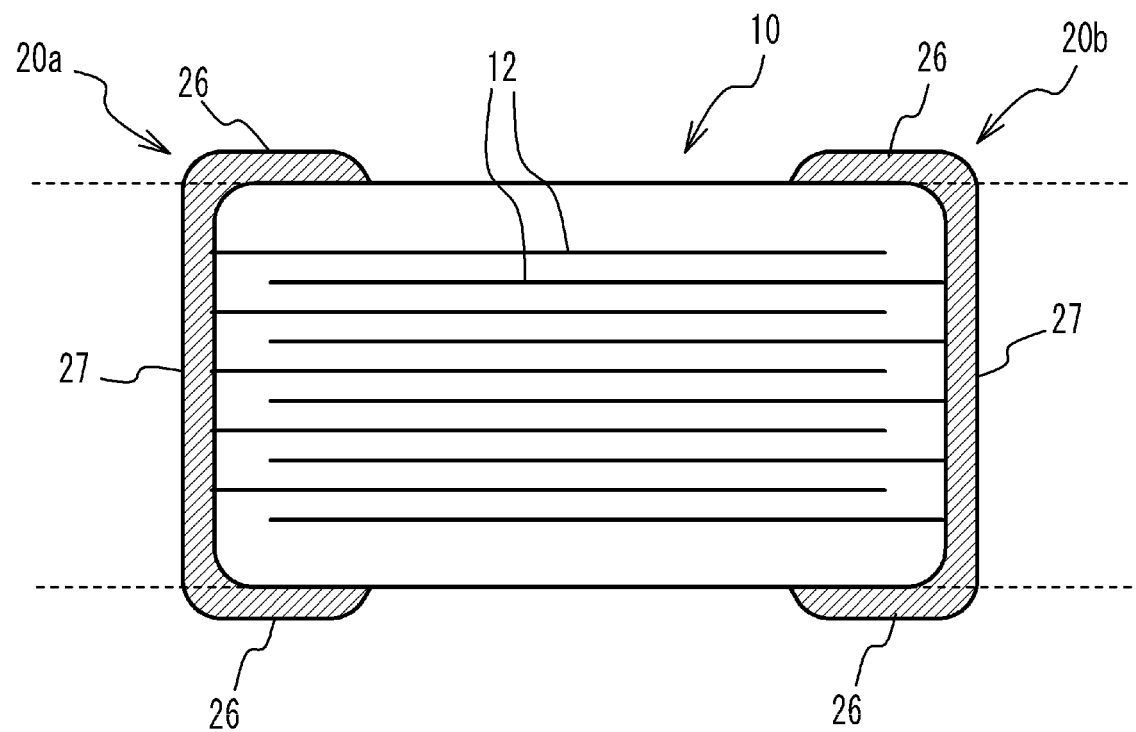

A description will be given of each part of the surface of the external electrodes 20a and 20b. As illustrated in FIG. 3A, four faces of each of the external electrodes 20a and 20b are referred to as an outer circumference of the external electrode (outer circumference 26). The outer circumference 26 covers a part of the upper face, a part of the lower face, and a part of the two side faces of the multilayer chip 10. A face of each of the external electrodes 20a and 20b covering each of the edge faces of the multilayer chip 10 is referred to as an edge face of the external electrode (an edge face 27). In concrete, as illustrated in FIG. 3B, when the multilayer ceramic capacitor 100 is seen from the side face thereof, the edge faces 27 of the external electrodes 20a and 20b are between a straight line obtained by extending the upper face of the multilayer chip 10 to the sides of the external electrodes 20a and 20b and a straight line obtained by extending the lower face of the multilayer chip 10 to the sides of the external electrodes 20a and 20b. And, the rest exposed surfaces of the external electrodes 20a and 20b are the outer circumferences 26.

In the multilayer ceramic capacitor 100 of the embodiment, a water repellent agent 30 is provided on the surface of the external electrodes 20a and 20b, as illustrated in FIG. 2. The water repellent agent 30 may be provided on an exposed surface of the multilayer chip 10 where the external electrodes 20a and 20b are not provided. A thickness of the water repellent agent 30 on the outer circumferences 26 of the external electrode 20a and 20b is a thickness A. A thickness of the water repellent agent 30 on the edge faces 27 is a thickness B. A relationship "thickness A>thickness B" is satisfied. The thickness is measured by an analysis method such as XPS (X-ray Photoelectron Spectroscopy).

The water repellent agent 30 is formed on the outer circumference 26. Therefore, adhesion of water on the surface of the outer circumference 26 is suppressed. It is therefore possible to suppress the connection between the external electrode 20a and the external electrode 20b caused by water. Accordingly, it is possible to suppress breakdown of the multilayer ceramic capacitor 100 caused by migration caused by the dew condensation.

Figure 4:
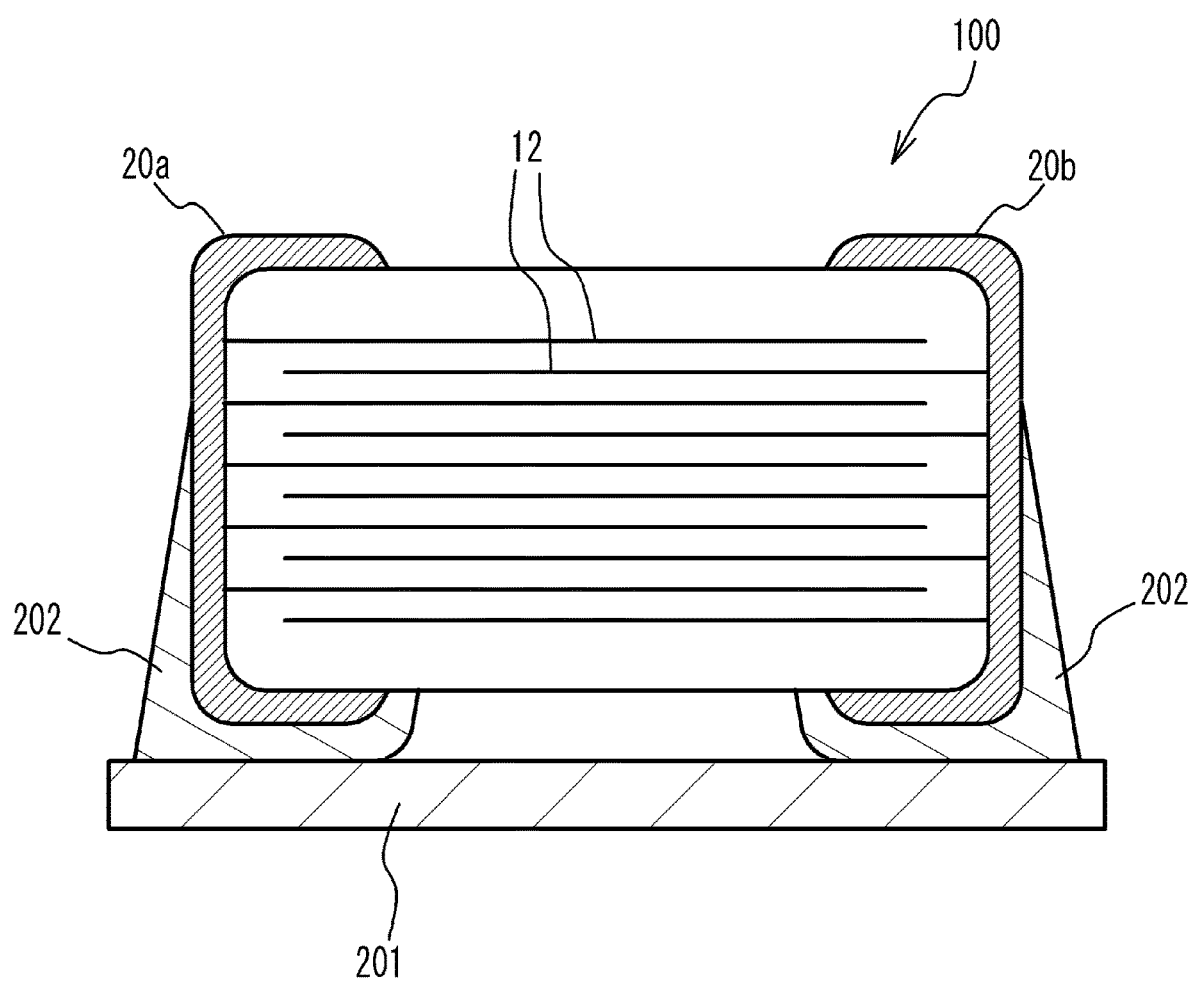
FIG. 4 illustrates a structure in which a multilayer ceramic capacitor is mounted on a circuit substrate.

The thickness B of the water repellent agent 30 on the edge face 27 is smaller than the thickness A of the water repellent agent 30 on the outer circumference 26. Therefore, the water repellent agent 30 on the edge face 27 is thin. In this case, the influence of the water repellent agent 30 on the edge face 27 is small. And, the solder crawls to the edge face 27. Therefore, solder bonding can be achieved. And mounting failure can be suppressed. FIG. 4 illustrates a structure in which the multilayer ceramic capacitor 100 is mounted on a circuit substrate 201. When the influence of the water repellent agent 30 on the edge face 27 is small, a solder 202 crawls to the edge face 27, as illustrated in FIG. 4.

In the embodiment, the relationship "the thickness A of the water repellent agent 30 on the outer circumference 26>the thickness B of the water repellent agent 30 on the edge face 27" is satisfied. It is therefore possible to suppress the mounting failure, even if the water repellent agent 30 is not removed.

When the water repellent agent 30 on the outer circumference 26 is excessively thin, adhesion of water on the outer circumference 26 may not be necessarily suppressed. And so, it is preferable that the thickness A of the water repellent agent 30 on the outer circumference has a lower limit. For example, it is preferable that the thickness A of the water repellent agent 30 on the outer circumference 26 is 10 nm or more. It is more preferable that the thickness A is 20 nm or more. It is still more preferable that the thickness A is 40 nm or more.

When the water repellent agent 30 on the outer circumference 26 is excessively thick, wettability of the solder with respect to the external electrodes 20a and 20b is degraded during mounting of the multilayer ceramic capacitor 100. And mounting failure may occur. And so, it is preferable that the thickness A of the water repellent agent 30 on the outer circumference 26 has an upper limit. For example, it is preferable that the thickness A of the water repellent agent 30 on the outer circumference 26 is 100 nm or less. It is more preferable that the thickness A is 60 nm or less.

When the water repellent agent 30 on the edge face 27 is excessively thick, the influence of the water repellent agent 30 is large. The wettability of the solder with respect to the external electrodes 20a and 20b may be degraded during mounting of the multilayer ceramic capacitor 100. And the mounting failure may occur. And so, it is preferable that the thickness B of the water repellent agent 30 on the edge face 27 has an upper limit. For example, it is preferable that the thickness B of the water repellent agent 30 on the edge face 27 is 50 nm or less. It is more preferable that the thickness B is 20 nm or less. It is still more preferable that the thickness B is 15 nm or less.

When the water repellent agent 30 is also provided on the exposed surfaces of the upper face, the lower face, and the two side faces of the multilayer chip 10 where the external electrodes 20a and 20b are not provided, the adhesion of water to the exposed surfaces of the multilayer chip 10 is suppressed. And, the breakdown caused by the migration due to the dew condensation can be suppressed.

The embodiment achieves remarkable effect in the multilayer ceramic capacitor which has the external electrode having the conductive resin layer 23 including grains such as silver causing the migration.

The material of the water repellent agent 30 is not limited when a contact angle of the material with respect to water is 90 degrees or more. The water repellent agent 30 is, for example, a silicon-based material. As the silicon-based material, organic compound having a siloxane bonding can be used. For example, the organic compound having the siloxane bonding is a small molecule cyclic siloxane which is a cyclic siloxane from D3 to D20. For example, the small molecule cyclic siloxane D3 is trimer of the cyclic siloxane which is a solid substance of hexamethyl cyclotrisiloxane ($C_6H_{18}O_3Si_3$). The small molecule cyclic siloxane D4 is tetramer of the cyclic siloxane which is semi-solid substance of octamethyl cyclotetrasiloxane ($C_8H_{24}O_4Si_4$). The organic compound having the siloxane bonding releases the small molecule cyclic siloxane Dn (n≥3) at a relatively high temperature. Therefore, the organic compound having the siloxane bonding tends to be left after mounting the multilayer ceramic capacitor 100 with solder.

Alternatively, as the material of the water repellent agent 30, fluorine-based material can be used.

Figure 5A:
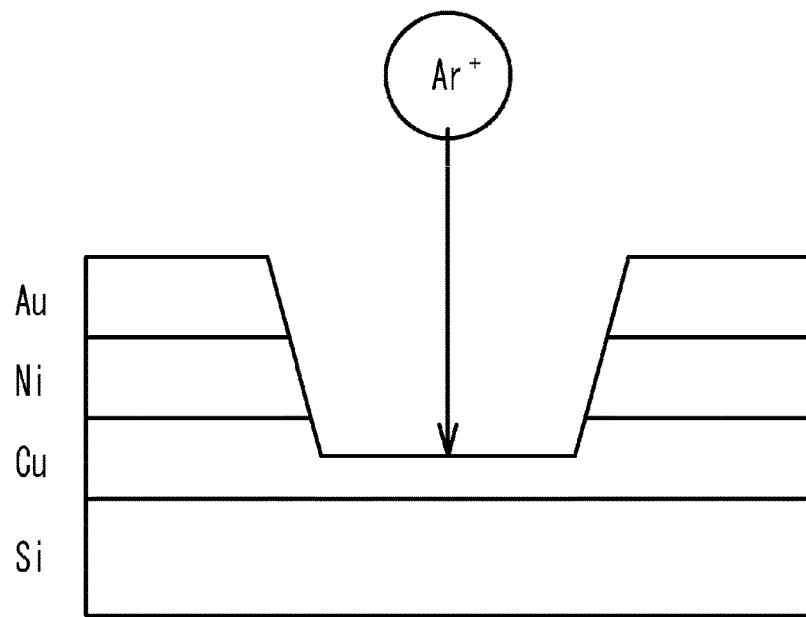
FIG. 5A and FIG. 5B illustrate an XPS depth analysis.
Figure 5B:
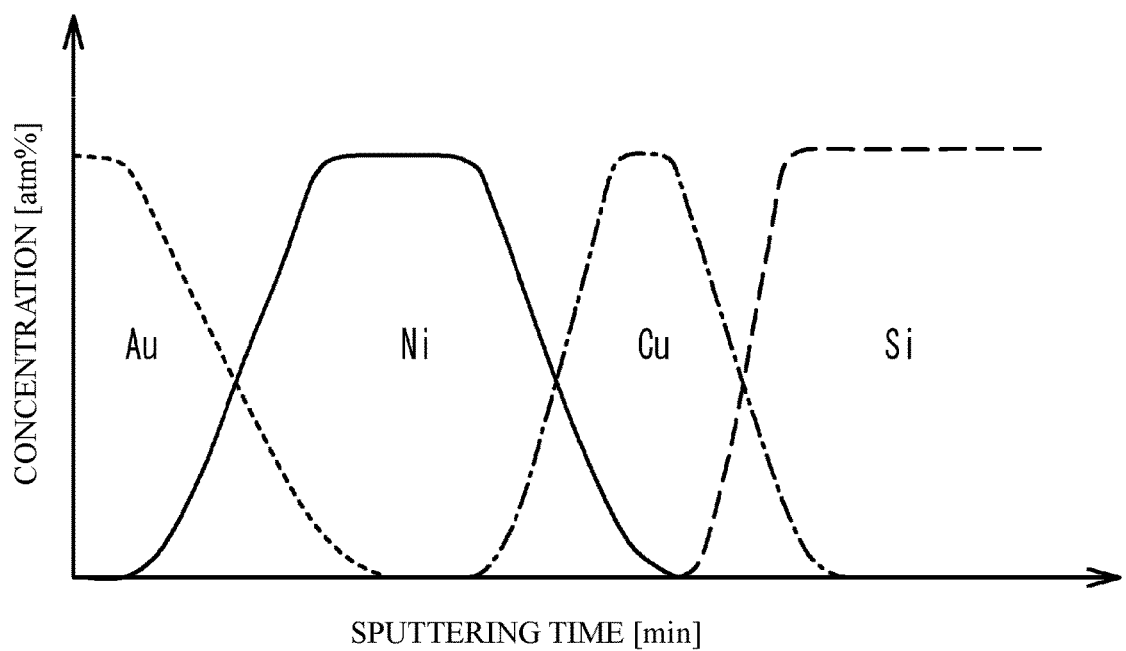

A description will be given of a measuring method of the water repellent agent 30. For example, an XPS (X-ray Photoelectron Spectroscopy) depth analysis can be used as the measuring method of the water repellent agent 30. With the XPS depth analysis, it is possible to measure component distribution in a depth direction. In concrete, a surface of a sample is scraped in a depth direction by sputtering using argon ion ($Ar^+$). As illustrated in FIG. 5, a concentration of a surface component is detected. Further, the surface of the sample is scraped. And a concentration of a surface component is detected. The process is repeated. Thus, as illustrated in FIG. 5B, a relationship between an accumulated time of the sputtering and a concentration of a detected component can be measured. The accumulated time of the sputtering can be converted into a thickness. It is therefore possible to measure the thickness of the water repellent agent 30.

Figure 6:
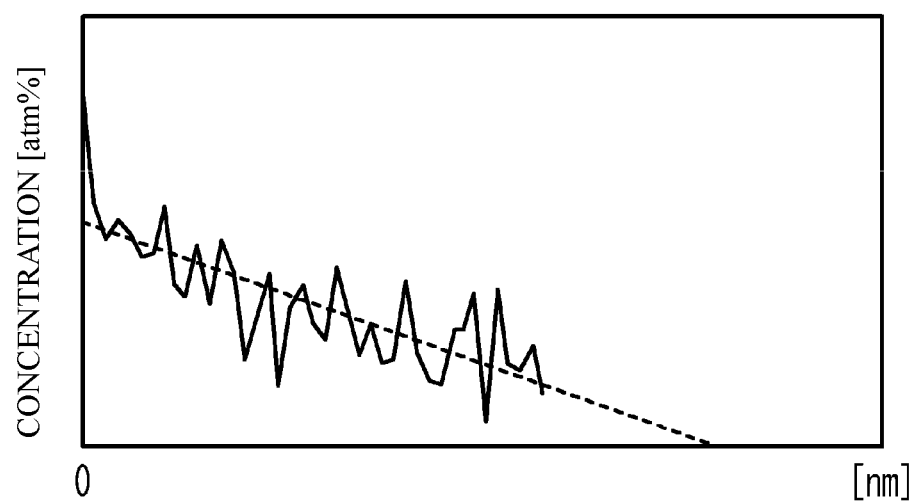
FIG. 6 illustrates measurement of a water repellent agent.

For example, as illustrated in FIG. 6, a primary correlation line is drawn on the basis of a plurality of plots between the thickness of the water repellent agent 30 and the component of the water repellent agent 30 (except for abnormal values). The accumulated time of the sputtering at which the concentration is zero (an intersection with the X axis) can be converted into the thickness of the water repellent agent 30.

Figure 7:
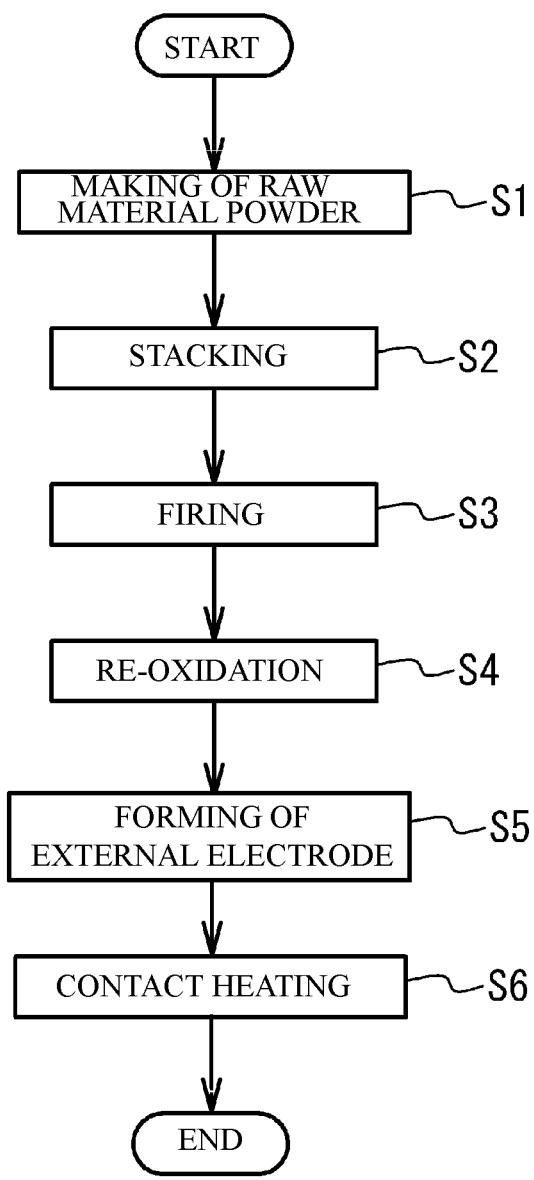
FIG. 7 illustrates a manufacturing method of a multilayer ceramic capacitor.

Next, a description will be given of a manufacturing method of the multilayer ceramic capacitor 100. FIG. 7 illustrates a manufacturing method of the multilayer ceramic capacitor 100.

(Making process of raw material powder)(S1) A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

(Stacking process)(S2) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet with a thickness of 0.8 µm or less is coated on a base material by, for example, a die coater method or a doctor blade method, and then dried.

Next, metal conductive paste for forming an internal electrode is applied to the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 500.

After that, a cover sheet to be the cover layer 13 is cramped on the multilayer structure of the dielectric green sheets. And another cover sheet to be the cover layer 13 is cramped under the multilayer structure. Thus, a ceramic multilayer structure is obtained. After that, the binder is removed from the ceramic multilayer structure (for example, 1.0 mm×0.5 mm) in $N_2$ atmosphere of 250 degrees C. to 500 degrees C.

(Firing process)(S3) The resulting compact is fired for ten minutes to 2 hours in a reductive atmosphere having an oxygen partial pressure of $10^{-7}$ to $10^{-10}$ atm in a temperature range of 1100 degrees C. to 1300 degrees C. In this manner, it is possible to manufacture the multilayer ceramic capacitor 100.

(Re-oxidizing process)(S4) After that, a re-oxidizing process may be performed in $N_2$ gas atmosphere in a temperature range of 600 degrees C. to 1000 degrees C.

(Forming process of external electrodes)(S5) Metal paste including a metal filler, a glass frit, a binder and a solvent is applied to the both end faces of the multilayer chip 10 by dipping, and is dried. After that, the metal paste is baked. Thus, the base layer 21 is formed. The binder and the solvent vaporize by the baking. In the method, it is preferable that the metal filler is Cu or the like. It is preferable that the baking is performed for 3 minutes to 30 minutes in a temperature range of 700 degrees C. to 900 degrees C. It is more preferable that the baking is performed for 5 minutes to 15 minutes in a temperature range of 760 degrees C. to 840 degrees C. After that, the first plated layer 22 may be formed on the base layer 21 by plating.

Next, the conductive resin layer 23 is formed. For example, the conductive resin layer 23 is formed by immersion-coating thermosetting resin such as epoxy resin or phenol resin in which conductive fillers such as Ag, Ni, Cu or the like are kneaded, on the surface of the first plated layer 22, and hardening the thermosetting resin by thermal treatment. The thickness of the conductive resin layer 23 is not limited. For example, the thickness of the conductive resin layer 23 is approximately 10 µm to 50 µm. The thickness of the conductive resin layer 23 may be determined in accordance with the size of the multilayer ceramic capacitor 100. After that, the second plated layer 24 and the third plated layer 25 are formed on the conductive resin layer 23 by electroplating or the like.

(Contact heating process)(S6) When the silicon-based material is used as the water repellent agent 30, silicon rubber is heated to 120 degrees C. or more and is contacted to the surface of the multilayer ceramic capacitor 100 after covering a region of the multilayer ceramic capacitor 100 other than a region on which the water repellent agent 30 is to be formed, with a mask. For example, when a mask covers a part of each of the external electrodes 20a and 20b which is other than the outer circumference 26, it is possible to selectively form the water repellent agent 30 on the outer circumference 26. Similarly, when another mask covers a part of each of the external electrodes 20a and 20b which is other than the edge face 27, it is possible to selectively form the water repellent agent 30 on the edge face 27. When another mask covers a part of the multilayer chip 10 which is other than the exposed region of the multilayer chip 10, it is possible to selectively form the water repellent agent 30 on the exposed region of the multilayer chip 10. The water repellent agent 30 becomes thicker, when the temperature of the heated silicon rubber and the heated fluorine rubber is increased and the number of the heating is increased. With the conditions, it is possible to adjust the thickness of the water repellent agent 30. The fluorine rubber is heated to 150 degrees C. or more, a surface of the multilayer ceramic capacitor 100 other than a region where the water repellent agent 30 is to be formed is covered by a mask, and the fluorine rubber contacts to the surface of the multilayer ceramic capacitor 100, when the fluorine-based material is used as the water repellent agent 30. Thus, the water repellent agent 30 is formed.

With the manufacturing method of the embodiment, the water repellent agent 30 is formed so that the relationship "the thickness A of the water repellent agent 30 of the outer circumference 26>the thickness B of the water repellent agent 30 on the edge face 27" is satisfied. In this case, it is possible to suppress the mounting failure even if the water repellent agent 30 is not removed.

When the silicon rubber is heated to 120 degrees C. or more and is contacted to the surface of the multilayer ceramic capacitor 100, the temperature at which the small molecule cyclic siloxane Dn (n≥3) is released from the water repellent agent 30 is 300 degrees C. or more. Therefore, a sufficient large amount of the water repellent agent 30 can be left, after mounting the multilayer ceramic capacitor 100 with solder.

The fluorine-based material which is not released from the surface of the multilayer ceramic capacitor 100 at a temperature of less than 380 degrees C. and is released from the surface of the multilayer ceramic capacitor 100 at a temperature of 380 degrees C. or more is adhered to the surface of the multilayer ceramic capacitor 100. Therefore, a sufficient large amount of the water repellent agent 30 can be left, after mounting the multilayer ceramic capacitor 100 with solder.

Figure 8:
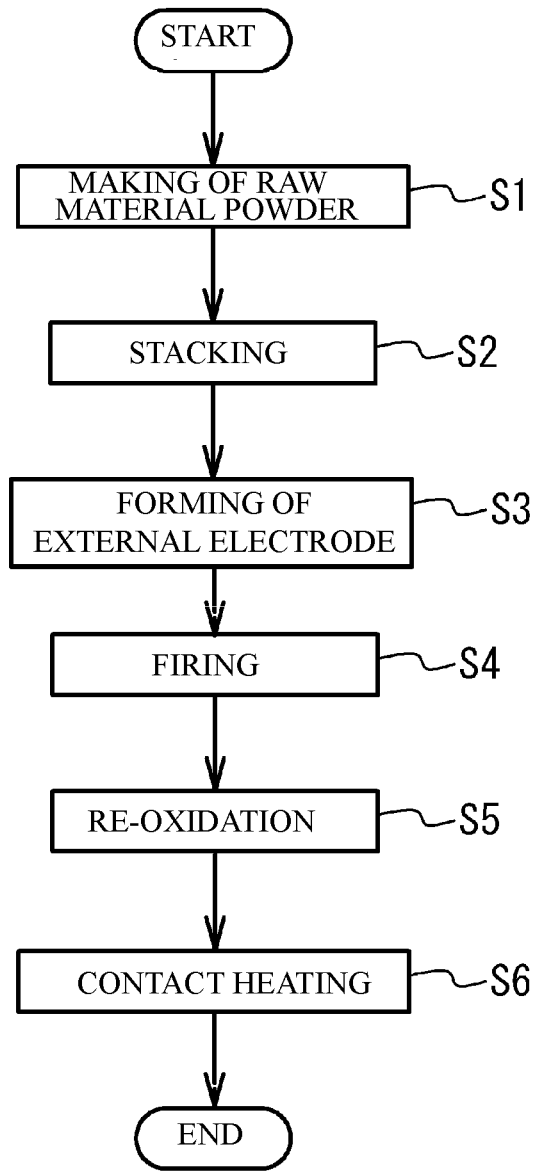
FIG. 8 illustrates a manufacturing method of a multilayer ceramic capacitor.

The base layer 21 may be fired together with the multilayer chip 10. In this case, as illustrated in FIG. 8, the binder is removed from the ceramic multilayer structure in $N_2$ atmosphere of 250 degrees C. to 500 degrees C. After that, metal paste including a metal filler, a co-material, a binder and a solvent is coated on the both end faces of the ceramic multilayer structure by a dipping method or the like and is dried (S3). After that, the metal paste is fired together with the ceramic multilayer structure (S4). Firing condition is described in the above-mentioned firing process. After that, a re-oxidizing process may be performed in $N_2$ gas atmosphere in a temperature range of 600 degrees C. to 1000 degrees C. (S5). After that, the first plated layer 22 is formed on the base layer 21 by plating. Next, the conductive resin layer 23 is formed on the first plated layer 22. After that, the second plated layer 24 and the third plated layer 25 are formed on the conductive resin layer 23 by electroplating or the like.

In the embodiment, the thicknesses A of the water repellent agent 30 of all of the four faces of the outer circumference 26 are larger than the thickness B of the water repellent agent 30 of the edge face 27. However, the structure is not limited. For example, the thickness A of the water repellent agent 30 of at least one of the four faces is larger than the thickness B of the water repellent agent 30 of the edge face 27.

In the embodiment, the water repellent agent 30 is provided on the edge face 27. However, the water repellent agent 30 may not be necessarily provided on the edge face 27. Therefore, the thickness A of the water repellent agent 30 on the outer circumference 26 is more than 0 nm. And, the thickness B of the water repellent agent 30 on the edge face 27 is 0 nm or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Examples 1 to 4 and comparative examples 1 and 2) An organic binder was kneaded with ceramic powder, of which a main component was barium titanate, having reduction resistant. Thus, slurry was prepared. The slurry was formed into a sheet by doctor blade. Thus, a dielectric green sheet was made. Metal conductive paste of Ni having a predetermined pattern was applied to the dielectric green sheet by screen printing. Thus, an internal electrode pattern was formed. The dielectric green sheet on which the internal electrode pattern was formed was stamped into a predetermined size. And a predetermined number of the dielectric green sheets were stacked. And a ceramic multilayer structure was made by thermos-compression.

Next, the ceramic multilayer structure was cut into predetermined chip sizes and was divided. Metal paste including a co-material was applied to the both end faces of the ceramic multilayer structure (faces exposed to external electrodes) by an immersion method so that the metal paste has a predetermined electrode width (E size).

Next, the resulting ceramic multilayer structure was fired at a 1250 degrees C. in nitrogen or hydrogen atmosphere and was subjected to a predetermined thermal treatment. Thus, the base layer 21 covering the multilayer chip 10 and the both end faces of the multilayer chip 10 was made. Next, the surface of the base layer 21 was subjected to dry polishing with use of "whitemorundum" (registered trademark) as a polishing agent. After that, the first plated layer 22 was formed by Cu-plating. Next, conductive resin paste of which viscosity was adjusted to a predetermined value (10 to 30 Pa·s) was applied to the surface of the first plated layer 22 by an immersion method. Epoxy resin in which an Ag filler was kneaded was used as the conductive resin paste. After that, the conductive resin layer 23 was formed by hardening the conductive resin paste by a thermal treatment. And, the second plated layer 24 and the third plated layer 25 were formed on the conductive resin layer 23 by Ni-plating and Sn-plating. The resulting multilayer ceramic capacitor 100 had a length of 3.2 mm, a width of 2.5 mm and a height of 2.5 mm. The distance between the external electrode 20a and the external electrode 20b was 1.6 mm.

The multilayer ceramic capacitors 100 were fixed to a jig. The regions other than the regions where the water repellent agent 30 were to be formed were masked. Fluorine rubber was contacted to the surfaces of the multilayer ceramic capacitors 100. Thus, the water repellent agent 30 was selectively formed on the regions which were not masked. In the example 1, the thickness of the water repellent agent 30 on the outer circumference was 9.32 nm. And the thickness of the water repellent agent 30 on the edge face 27 was 2.79 nm. In the example 2, the thickness of the water repellent agent 30 on the outer circumference was 19.26 nm. And the thickness of the water repellent agent 30 on the edge face 27 was 4.65 nm. In the example 3, the thickness of the water repellent agent 30 on the outer circumference was 32.95 nm. And the thickness of the water repellent agent 30 on the edge face 27 was 7.71 nm. In the example 4, the thickness of the water repellent agent 30 on the outer circumference was 48.66 nm. And the thickness of the water repellent agent 30 on the edge face 27 was 10.15 nm. In the comparative example 1, the water repellent agent 30 was formed on neither the outer circumference 26 nor the edge face 27. In the comparative example 2, the thickness of the water repellent agent 30 on the outer circumference was 18.69 nm. And the thickness of the water repellent agent 30 on the edge face 27 was 52.46 nm.

Next, other 200 samples were subjected to a dew condensation test, with respect to each of the examples 1 to 4 and the comparative examples 1 and 2. The samples were mounted on reliable substrates (CEM 3). The samples were put in a thermo-hygrostat tank. And, 16 V was applied to the samples. A dew condensation test program of JIS 60068-2-30 was performed 6 times. After that, it was confirmed whether the migration occurred or not. The condition of each cycle of the program is as follows. (1) The humidity was kept at 98%. The temperature was changed from 25 degrees C. to 55 degrees C. for 3 hours. (2) The temperature was kept at 55 degrees C. The humidity was changed from 98% to 93% for 15 minutes. (3) The temperature was kept at 55 degrees C. and the humidity was kept at 93% for 9 hours and 25 minutes. (4) The humidity was kept at 93%. The temperature was changed from 55 degrees C. to 25 degrees C. for three hours. (5) The temperature was kept at 25 degrees C. and the humidity was kept at 93% for 3 hours. (6) The temperature was kept at 25 degrees C. The humidity was changed from 93% to 98% for 5 hours and 30 minutes. Each sample was observed by a stereomicroscope of 40 magnifications. And it was determined whether there was a precipitate between external electrodes. When there was a precipitate, it was determined that the migration occurred.

200 samples were subjected to a mounting test, with respect to each of the examples 1 to 4 and the comparative examples 1 and 2. In the mounting test, a reflow furnace of which a maximum temperature was 270 degrees C. or more was used. And, an external view was observed with respect to each sample. When the crawling angle of the edge of the solder fillet was less than 90 degrees with respect to the edge face of the external electrode, it was determined as acceptance. When the crawling angle was 90 degrees or more, it was determined as non-acceptance.

Table shows the results. As shown in Table 1, all samples of the examples 1 to 4 were determined as good in the dew condensation test. It is thought that this was because the water repellent agent 30 was formed on the outer circumference 26. All samples of the comparative example 2 were determined as good in the dew condensation test. It is thought that this was because the water repellent agent 30 was formed on the outer circumference 26. However, in the comparative example 1, 12 samples among 200 samples were determined as bad in the dew condensation test. It is thought that this was because the water repellent agent 30 was not formed on the outer circumference 26.

TABLE 1

|  | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| THICKNESS OF OUTER CIRCUMFERENCE [nm] | 9.32 | 19.26 | 32.95 | 48.66 | 0 | 18.69 |
| THICKNESS EDGE FACE [nm] | 2.79 | 4.65 | 7.71 | 10.15 | 0 | 52.46 |
| DEW CONDENSATION | 0/200 | 0/200 | 0/200 | 0/200 | 12/200 | 0/200 |
| MOUTING | 0/200 | 0/200 | 0/200 | 0/200 | 0/200 | 4/200 |

Next, all samples of the examples 1 to 4 were determined as good in the mounting test. It is thought that this was because the thickness B of the water repellent agent 30 on the edge face 27 was smaller than the thickness A of the water repellent agent 30 on the outer circumference 26, and the water repellent agent 30 suppressed the prevention of the crawling of the solder on the edge face 27. In the comparative example 1, all samples were determined as good in the mounting test. It is thought that this was because the water repellent agent 30 was not formed on the edge face 27. However, in the comparative example 2, 4 samples among 200 samples were determined as bad in the mounting test. It is thought that this was because the thickness B of the water repellent agent 30 on the edge face 27 was larger than the thickness A of the water repellent agent 30 on the outer circumference 26, and the water repellent agent 30 did not suppress the prevention of the crawling of the solder on the edge face 27.

(Examples 5 to 8) The multilayer ceramic capacitors were made by the same processes as those of the examples 1 to 4. The multilayer ceramic capacitors 100 were fixed to a jig. The regions other than the regions where the water repellent agent 30 were to be formed were masked. Silicon rubber was contacted to the surfaces of the multilayer ceramic capacitors 100. Thus, the water repellent agent 30 was selectively formed on the regions which were not masked. In the example 5, the thickness of the water repellent agent 30 on the outer circumference was 9.49 nm. And the thickness of the water repellent agent 30 on the edge face 27 was 3.82 nm. In the example 6, the thickness of the water repellent agent 30 on the outer circumference was 22.36 nm. And the thickness of the water repellent agent 30 on the edge face 27 was 5.99 nm. In the example 7, the thickness of the water repellent agent 30 on the outer circumference was 31.14 nm. And the thickness of the water repellent agent 30 on the edge face 27 was 8.01 nm. In the example 8, the thickness of the water repellent agent 30 on the outer circumference was 50.69 nm. And the thickness of the water repellent agent 30 on the edge face 27 was 11.36 nm. In the comparative example 3, the water repellent agent 30 was formed on neither the outer circumference 26 nor the edge face 27. In the comparative example 4, the thickness of the water repellent agent 30 on the outer circumference was 19.91 nm. And the thickness of the water repellent agent 30 on the edge face 27 was 28.19 nm.

The examples 5 to 8 and the comparative examples 3 and 4 were subjected to the mounting test and the dew condensation test. Table 2 shows the results. As shown in Table 2, all samples of the examples 5 to 8 were determined as good in the dew condensation test. It is thought that this was because the water repellent agent 30 was formed on the outer circumference 26. All samples of the comparative example 4 were determined as good in the dew condensation test. It is thought that this was because the water repellent agent 30 was formed on the outer circumference 26. However, in the comparative example 3, 12 samples among 200 samples were determined as bad in the dew condensation test. It is though that this was because the water repellent agent 30 was not formed on the outer circumference 26.

TABLE 2

|  | EXAMPLE 5 | EXAMPLE 6 | EXAMPLE 7 | EXAMPLE 8 | COMPARATIVE EXAMPLE 3 | COMPARATIVE EXAMPLE 4 |
|---|---|---|---|---|---|---|
| THICKNESS OF OUTER CIRCUMFERENCE [nm] | 9.49 | 22.36 | 31.14 | 50.69 | 0 | 19.91 |
| THICKNESS EDGE FACE [nm] | 3.82 | 5.99 | 8.01 | 11.36 | 0 | 28.19 |
| DEW CONDENSATION | 0/200 | 0/200 | 0/200 | 0/200 | 12/200 | 0/200 |
| MOUTING | 0/200 | 0/200 | 0/200 | 0/200 | 0/200 | 2/200 |

Next, all samples of the examples 5 to 8 were determined as good in the mounting test. It is thought that this was because the thickness B of the water repellent agent 30 on the edge face 27 was smaller than the thickness A of the water repellent agent 30 on the outer circumference 26, and the water repellent agent 30 suppressed the prevention of the crawling of the solder on the edge face 27. All samples of the comparative example 3 were determined as good in the mounting test. It is thought that this was because the water repellent agent 30 was not formed on the edge face 27. However, in the comparative example 4, two samples among 200 samples were determined as bad in the mounting test. It is thought that this was because the thickness of the water repellent agent 30 on the edge face 27 was larger than the thickness A of the water repellent agent 30 on the outer circumference 26, and the water repellent agent 30 did not suppress the prevention of the crawling of the solder on the edge face 27.

The thickness of the water repellent agent 30 was measured by the XPS depth analysis. The device used in the XPS depth analysis was Quantera SXM made by ULVAC PHI. Al Kα (monochrome) was used as an excited X-ray. An analyzed diameter was 100 μm. Electrons/Ar ions were used for electrostatic charge neutralization. The sputtering rate was 40 cycle per 1 min in 1 cycle at 0.5 kV (0.36 nm/min in a case of $SiO_2$).

Although the embodiments of the present invention have been described in detail, it is to be understood that the various change, substitutions, and alterations could be made hereto without departing from the spirit and scope of the invention.

What is claimed is:

1. A ceramic electronic device comprising:
    a multilayer chip in which each of a plurality of dielectric layers and each of a plurality of internal electrode layers are alternately stacked, a main component of the dielectric layers being ceramic, the multilayer chip having a rectangular parallelepiped shape, the plurality of internal electrode layers being exposed to at least one of a first end face and a second end face of the multilayer chip, the first end face facing with the second end face;
    external electrodes provided on the first end face and the second end face; and
    a water repellent agent formed on a surface of the external electrodes,
    wherein a thickness A (>0) of the water repellent agent on at least one of four faces of the external electrodes that cover an upper face in a stacking direction, a lower face in the stacking direction, and two side faces of the multilayer chip is larger than a thickness B (>0) of the water repellent agent on faces of the external electrodes that cover the first end face and the second end face,
    wherein, when the ceramic electronic device is seen from the two side faces, the faces of the external electrodes that cover the first end face and the second end face are between a straight line obtained by extending the upper face toward the external electrodes and a straight line obtained by extending the lower face toward the external electrodes.

2. The ceramic electronic device as claimed in claim 1, wherein the thickness A is 10 nm or more.

3. The ceramic electronic device as claimed in claim 1, wherein the external electrodes include a conductive resin layer including a metal component.

4. The ceramic electronic device as claimed in claim 1, wherein the water repellent agent includes at least one of a silicon-based material and a fluorine-based material.

5. The ceramic electronic device as claimed in claim 1, wherein the water repellent agent is exposed to atmosphere, on the surface of the external electrodes.

6. The ceramic electronic device as claimed in claim 1, wherein the ceramic electronic device has a length of 1.0 mm or less, a width of 0.5 mm or less, and a height of 0.5 mm or less.

7. The ceramic electronic device as claimed in claim 1, wherein the ceramic electronic device has a length of 3.2 mm or less, a width of 1.6 mm or less, and a height of 1.6 mm or less.

8. The ceramic electronic device as claimed in claim 3, wherein a thickness of the conductive resin layer is 10 μm or more and 50 μm or less.

9. The ceramic electronic device as claimed in claim 1, wherein the thickness A is 50 nm or less.

10. The ceramic electronic device as claimed in claim 1, wherein the thickness B is 2.5 nm or more and 11 nm or less.

\* \* \* \* \*